US007689599B1

(12) United States Patent
Shah et al.

(10) Patent No.: US 7,689,599 B1
(45) Date of Patent: Mar. 30, 2010

(54) REPAIR OF INCONSISTENCIES BETWEEN DATA AND METADATA STORED ON A TEMPORAL VOLUME USING TRANSACTION LOG REPLAY

(75) Inventors: Aalop Shah, Pune (IN); Milind Borate, Pune (IN); Ganesh Varadarajan, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 535 days.

(21) Appl. No.: 11/047,006

(22) Filed: Jan. 31, 2005

(51) Int. Cl.
*G06F 17/30* (2006.01)
(52) U.S. Cl. .................................. 707/202; 714/19
(58) Field of Classification Search ................ 707/102, 707/200, 202, 201; 711/162, 173; 714/19
See application file for complete search history.

(56) References Cited

U.S. PATENT DOCUMENTS

| | | | | |
|---|---|---|---|---|
| 5,864,849 | A * | 1/1999 | Bohannon et al. ............... 707/8 |
| 6,041,423 | A * | 3/2000 | Tsukerman .................... 714/19 |
| 6,584,582 | B1 * | 6/2003 | O'Connor ..................... 714/21 |
| 6,678,704 | B1 * | 1/2004 | Bridge et al. ................ 707/202 |
| 6,678,809 | B1 * | 1/2004 | Delaney et al. ............. 711/162 |
| 6,795,966 | B1 * | 9/2004 | Lim et al. ....................... 718/1 |
| 7,054,960 | B1 * | 5/2006 | Bezbaruah et al. ............. 710/33 |
| 7,065,674 | B2 * | 6/2006 | Cabrera et al. ................ 714/16 |
| 7,082,446 | B1 * | 7/2006 | Bottomley ................... 707/204 |
| 7,158,991 | B2 * | 1/2007 | Kekre et al. ................. 707/102 |
| 7,269,706 | B2 * | 9/2007 | Agarwal et al. ............. 711/173 |
| 7,305,582 | B1 * | 12/2007 | Moser et al. ................... 714/13 |
| 2005/0193244 | A1 | 9/2005 | Stager et al. .................. 714/12 |
| 2005/0246612 | A1 * | 11/2005 | Leis et al. .................... 714/763 |
| 2005/0251540 | A1 * | 11/2005 | Sim-Tang .................... 707/202 |
| 2006/0064416 | A1 | 3/2006 | Sim-Tang ....................... 707/6 |

OTHER PUBLICATIONS

C. Mohan, ARIES: A Transaction Recovery Method Supporting Fine-Granularity Locking and Partial Rollbacks Using Write-Ahead Logging, Mar. 1992, pp. 111, 121 and 130.*

* cited by examiner

*Primary Examiner*—Luke S. Wassum
*Assistant Examiner*—Sherief Badawi
(74) *Attorney, Agent, or Firm*—Campbell Stephenson LLP; Jonathan N. Geld; Ana G. Luther

(57) ABSTRACT

Method, system, and apparatus for maintaining consistent images of metadata and data in a file system or other data journaling software stored on a temporal volume are presented. An intent log is maintained of all data and metadata modifying transactions, which is then relayed either asynchronously or form a last known consistent checkpoint to a requested checkpoint thereby rendering the requested checkpoint data and metadata consistent.

22 Claims, 6 Drawing Sheets

|  | 0 | 1 | 2 | 3 | 4 | 5 | 6 | 7 | 8 |
|---|---|---|---|---|---|---|---|---|---|
| $t_0$ | S0 | 0 | 0 | 0 | i3 | 0 | c→3 | empty | text |
| $t_1$ | S0 | tr1: ren a/c b/d | 0 | 0 | i3 | 0 | c→3 | empty | text |
| $t_2$ | S0 | tr1: ren a/c b/d | 0 | 0 | i3 | 0 | empty | empty | text |
| $t_3$ | S0 | tr1: ren a/c b/d | tr2: cr b/e | 0 | i3 | 0 | empty | empty | text |
| $t_4$ | S0 | tr1: ren a/c b/d | tr2: cr b/e | 0 | i3 | 0 | empty | d→3 | text |
| $t_5$ | S0 | tr1: ren a/c b/d | tr2: cr b/e | 0 | i3 | i4 | empty | d→3 | text |
| $t_6$ | S0 | tr1: ren a/c b/d | tr2: cr b/e | 0 | i3 | i4 | e→4 | d→3 | text |

Figure 1A

| $t_2$ 150 | S0 | tr1: ren a/c b/d | 0 | 0 | i3 | 0 | empty | empty | text |
|---|---|---|---|---|---|---|---|---|---|
| $t_2$ 160 | S0 | tr1:ren a/c b/d | 0 | 0 | i3 | 0 | empty | d→3 | text |

Figure 1B

|  | 0 | 1 | 2 | 3 | 4 | 5 | 6 | 7 | 8 |
|---|---|---|---|---|---|---|---|---|---|
| $t_0$ | S0 | 0 | 0 | 0 | i3 | 0 | c→3 | empty | text |
| $t_1$ | " | tr1: ren a/c b/d | " | " | " | " | " | " | " |
| $t_2$ | " | " | " | " | " | " | empty | " | " |
| $t_3$ | " | " | tr2: cr b/e | " | " | " | " | " | " |
| $t_4$ | " | " | " | " | " | " | " | d→3 | " |
| $t_5$ | " | " | " | " | " | i4 | " | " | " |
| $t_6$ | " | " | " | " | " | " | e→4 | " | " |

Figure 2A

|  | 0 | 1 | 2 | 3 | 4 | 5 | 6 | 7 | 8 |
|---|---|---|---|---|---|---|---|---|---|
| $t_0$ | S0 | 0 | 0 | 0 | i3 | 0 | c→3 | empty | text |
| $t_1$ | " | tr1: ren a/c b/d | " | " | " | " | empty | d→3 | " |
| $t_2$ | " | " | " | " | " | " | empty | " | " |
| $t_3$ | " | " | tr2: cr b/e | " | " | i4 | e→4 | " | " |
| $t_4$ | " | " | " | " | " | " | " | d→3 | " |
| $t_5$ | " | " | " | " | " | i4 | " | " | " |
| $t_6$ | " | " | " | " | " | " | e→4 | " | " |

Figure 2B

REPAIR OF INCONSISTENCIES BETWEEN DATA AND METADATA STORED ON A TEMPORAL VOLUME USING TRANSACTION LOG REPLAY

FIELD OF THE INVENTION

The field of this invention relates to data storage systems. Specifically, a method, system, and apparatus is presented to repair metadata inconsistencies in a journaling file system on a temporal volume.

BACKGROUND OF THE INVENTION

The ready ability for a business to store, process and to transmit data is a facet of operations that a business relies upon to conduct its day-to-day activities. For businesses that increasingly depend upon data for their operations, an inability to store, process, or transmit data can hurt a business' reputation and bottom line. Businesses are therefore taking measures to improve their ability to store, process, transmit, and restore data, and to more efficiently share the resources that enable these operations.

The ever-increasing reliance on data and the computing systems that produce, process, distribute, and maintain data in its myriad forms continues to put great demands on techniques for data protection. Simple systems providing periodic backups of data have given way to more complex and sophisticated data protection schemes that take into consideration a variety of factors, including a wide variety of computing devices and platforms, numerous different types of data that must be protected, speed with which data protection operations must be executed, and flexibility demanded by today's users.

In many cases, disaster recovery involves restoring data to a point in time when the desired data was in a known and valid state. Backup schemes to ensure recoverability of data at times in the past are varied. Such schemes have traditionally included periodic full backups followed by a series of differential backups performed at intervals between the full backups. In such a manner, a data set can be restored at least to a point in time of a differential backup. Such an approach can be resource intensive as permanent records of the full and differential backups must be kept in order to ensure that one can restore a data set to a state at a particular point in time, especially to point in the distant past. Further, the process of restoring a data volume from a full and a series of differential backups can be time and resource consuming, leading to delays in making the data available to the users.

One approach to providing a less resource-intensive capacity to restore a data set to a particular prior point in time is temporal storage, also known as time-indexed storage and time-addressable storage. Temporal storage can be implemented by associating a temporal volume with a particular data set. A temporal volume maintains non-present data in addition to the data in its present state. A temporal volume maintains the history of data stored on the temporal volume, thus providing a way for an application to retrieve a copy of the data at any time in the past. A temporal volume can be a host-based implementation or implemented through an appliance that exports the temporal volume.

Temporal volumes provide an infrastructure for maintaining and accessing temporal data. Temporal volumes can be used by applications at all levels, including file systems and database management systems. In addition, temporal volumes can also be used as building blocks for data archiving, versioning, replication, and backup through integration with file system and backup products. Temporal volumes preserve temporal content so that the content can be used at a later point in time for snapshots, incremental backups, replication, restoring corrupted volumes or deleted files, etc.

In a normal storage volume, when data changes, a data block is changed in situ. In a temporal volume, when a block of data is changed, the existing block can be preserved, and a new data block can be written to a separate location and associated with a time stamp; metadata in the temporal volume is also manipulated to provide a link to the new data block. Old versions of a data block are maintained even when the data block is deleted. This achieves the effect of maintaining copies of one or more states of the data in the past. This process can also be thought of as continuous versioning of the data on the disk volume, and retaining snapshots of the volume whenever the data changes. Another temporal storage implementation provides the same effect of maintaining data at points in time by preserving an existing block along with some record of the time of change, and then writing the new data block to the device.

There are many possible embodiments for temporal volumes. In one embodiment, the contents of a temporal volume can be preserved using an indexing system or structure. An indexing structure can be formed using a space-optimized persistent store by allocating the storage over a cache object. A cache object is a logical storage object that gives an illusion of infinite space, while using only limited actual storage space. The cache object accomplishes this by provisioning storage on an as-needed basis.

In another embodiment, the temporal volume can be divided into one or more regions. A region may be anywhere from one physical block of the disk to regions of kilobytes, megabytes, gigabytes, etc. Each region can have a time stamp associated with the region. Applications accessing the temporal volume can specify the time stamps associated with the regions. Alternatively, a time stamp may be specified by an application or the temporal volume manager when data is written to the temporal volume.

Ideally, a temporal volume stores every change that happens to every block of data. But practically, users may be interested in storing only certain changes or images of the volume at only certain points in time or after a defined event. These points at which data is stored on a temporal volume are "checkpoints" of the data. As discussed below, checkpoints can be linked, for example, to the passage of time, the number of changes to associated data, or to a quantity of changes in a section of a volume. Defining the regularity and system of checkpointing can be done by setting a temporal granularity attribute, which is a policy describing when the changes to data on a temporal volume should be stored. The policy will define when a new checkpoint or image of the data on the volume is created internally. Temporal granularity of data can be supplied and maintained in a temporal volume in several ways, including, but not limited to: zero granularity (also known as continuous checkpointing), periodic granularity (also known as regular checkpointing), fixed change granularity, N-change granularity, and application controlled checkpointing.

Zero granularity, or continuous checkpointing, is the ideal case mentioned above. A temporal volume configured with zero granularity maintains every change to the data. That is, whenever a data block is modified, the modification to the data block is recorded and associated with a time stamp reflecting the time of change. In general, the time stamp is distinct from the concept of a checkpoint. A checkpoint can be thought of as an index point at which modified data is recorded, while a time stamp reflects the time of the data recordation. When a data block is recorded at a checkpoint, the previous version of the data block is also maintained.

Periodic granularity, or regular checkpointing, represents a scenario in which changes to data are stored only at periodic intervals in time. For example, if the granularity is set to two minutes, then an image of modified data will be retained only every two minutes.

In a temporal volume with an N-change temporal granularity policy, changes to a block of data or a set of data will be retained with a time stamp only when a set number of modifications to the data have been made.

A similar granularity policy is a fixed-change granularity, where changes to a volume are checkpointed and retained when a set amount of data has changed on the volume. For example, if a granularity attribute is sent to ten megabytes, then when ten megabytes of data change on the volume, all modified blocks since the previous time stamp are associated with a checkpoint and retained. Unlike with a N-change granularity, the checkpoint associated with each block occurs at the same real time (even though the criteria for checkpointing data is divorced from real time), but the number of changes associated with each individual block of data can differ from block to block and from checkpoint to checkpoint.

In an application-controlled checkpointing policy, changed data is checkpointed only when an application asks the temporal volume to checkpoint a block of data, a file, a region of data, or the entire volume of data. In application-controlled checkpointing, an application issues an I/O request that specifies a new checkpoint should be created within the temporal volume, rather than providing a time stamp with every write.

A file system can be stored on a temporal volume in much the same manner as a file system can be stored on a normal volume. A file system on a temporal volume will, by its nature, contain file system data at each checkpoint stored on the temporal volume in accord with the selected temporal granularity policy. Issues related to file system data recovery on a normal (non-temporal) volume can also be concerns at each checkpoint on a temporal volume.

In general, a file system is a data structure or a collection of files. In the Unix operating system, for example, "file system" can refer to two distinct things: a directory tree or the arrangement of files on disk partitions. The latter has a tangible physical location and can be thought of as a physical file system, while the former is a logical structure and can be thought of as a logical file system. A physical file system is mounted on a portion of a normal volume called a partition. Partition size determines the amount of volume memory space that the file system can use. Volume memory space is typically divided into a set of uniformly sized blocks that are allocated to store information in the file system. Typical file systems have a superblock, inodes and data blocks.

A superblock stores information about the file system. Such information can include size and status of the file system, a label (file system name and volume name), size of the file system logical block, date and time of the last update to the file system, summary data block, file system state, extent maps, directories, free inode maps, and a path name of a last mount point of the file system. A superblock can also include references to the location of additional file system structural files. A superblock contains critical data related to the file system without which the file system could not be accessed, and therefore often multiple, redundant superblocks are made when a file system is created. The summary data block within the superblock can record changes that take place as the file system is used and can include the number of inodes, directories, fragments, and storage blocks within the file system.

Information about each file in a file system can be kept in a structure called an inode. An inode contains pointers to disk blocks of one or more volumes containing data associated with a file, as well as other information such as the type of file, file permission bits, owner information, file size, file modification time, etc. This additional information is often referred to as metadata. Pointers in an inode point to data blocks or extents on the volume in file system memory space.

The rest of the space that is allocated to a file system contains data blocks or extents. The size of a data block is determined when a file system is created. For a regular file, data blocks contain the contents of the file. For a directory, the data blocks contain entries that give inode number and file name of files in the directory. Blocks that are not currently being used as inodes, indirect address blocks, or as data blocks can be marked as free in the superblock. Further, a list of modes in the file system is also maintained, either in the superblock or referenced by the superblock.

In a file system on a normal volume, whenever files are created, extended, truncated or deleted, the file system updates inodes and other metadata that make a file system disk image self describing. Many file system operations involve multiple metadata changes. For example, when a file is extended, its inode must be updated to reflect the extension and the storage space into which the file is extended must be moved from the file system's free space pool. Most file systems cache metadata changes and write them lazily in order improve I/O performance. Lazy writing of metadata changes causes a possibility that cached metadata updates may be lost in the event of a system crash, thereby making the file system metadata inconsistent with actual data.

One method of verifying and repairing file system integrity, including metadata inconsistency, is to run a program that validates file system metadata and repairs the metadata, if necessary, before the file system is mounted. Such file system validation programs (e.g., fsck (Unix) and CHKDSK (Microsoft Windows®)) can perform tasks such as verifying that disk blocks are not lost or multiply allocated. File system validate programs can also undo partially complete updates, causing recent actions to be removed, but ultimately leaving the file system structurally intact. Such repair programs can take a long time to run and the file system cannot be mounted until the checking is complete.

An alternate recovery technique is used by journaling file systems, which log their intent to update metadata before actually updating the metadata. Each time metadata changes in a journaling file system (e.g., when a file or directory is created, extended, or deleted), the file system logs a description of the updates that constitute the change before performing them. When recovering from a system failure, a journaling file system reads its log and verifies that all metadata updates described in the log are reflected on the storage device. At any instant, the number of metadata updates described in an intent log is a small fraction of the total amount of metadata in a large file system. Therefore, log-based recovery enables file systems to recover from a system crash more quickly than a file system verification program. Similar log-based recovery is available with other types of journaling software, such as databases.

FIG. 1A illustrates a series of changes in data blocks 0-8 in a journaling file system while performing two tasks. The nine blocks in the example file system represent the following types of data:

| Block No. | Contents |
|---|---|
| 0 | Superblock |
| 1, 2, 3 | Intent log |
| 4, 5 | Inodes |
| 6 | Directory block for directory "a" |
| 7 | Directory block for directory "b" |
| 8 | Data for inode #3 |

The initial state of the illustrated file system contains a superblock S0, no records in the log, block 4 contains inode 3 ("i3"), and directory block "a" contains an association of a name "c" with inode 3. Two transactions will be performed out upon this data. First, an transaction "rename a/c b/d" will be performed, which requires: (i) writing a log record related to the transaction, (ii) removing the entry associating "c" with inode 3 from directory "a", and (iii) adding an entry associating "d" with inode 3 in directory "b". Concurrently, another transaction "create a/e" is conducted that requires: (i) writing a log record for the transaction, (ii) allocating inode i4, and (iii) entering i4 into directory "a" and associating the inode with name "e". In FIG. 1A, these transactions are shown step-by-step taking place at discrete times $t_0$-$t_6$ in the table. Quotation marks in the table imply that data in the block is the same as for that in the prior time step. For example, the steps involved in the rename operation are:

$t_1$: a transaction log entry is made into block 1;

$t_2$: the entry associating c with inode 3 is removed from the directory block for directory a; and $t_4$: an entry associating named d with inode 3 is entered into the directory block for directory b.

A similar set of entries is shown for the create operation.

At times $t_2$ and $t_3$, the file system metadata is inconsistent with file system data. Inode i3 has been orphaned, meaning the inode has no name space entry. Should the system crash at this point there would be an inconsistent disk image to recover. The transaction log entry in block 1 allows the system to replay the transaction and thereby create an image in which the metadata is consistent with the data. "Replaying the log" means carrying out all pending transactions listed in the intent log (e.g., blocks 1, 2, and 3). FIG. 1B illustrates the data at $t_2$ before replaying the log image (150) (this is the same as the data shown in FIG. 1A at $t_2$), and the data in the file system at $t_2$ after replaying the log (160). The post-replay state is metadata consistent because a name space entry is now present for inode 3 (i.e., name d is associated with inode 3 in directory b) and the transaction is indicated as being completed in block 2.

A temporal volume storing the file system in FIG. 1A has checkpoint images of the state of the file system at each instance in time $t_0$-$t_6$. Therefore, should a user or application attempt to access the file system at a time in the past, for example, $t_2$, the user or application will find that the state of the file system can be metadata inconsistent. The state of the file system at each instance in time will be the same as the state of the file system had there been a system crash at that time. What is therefore needed is a mechanism for maintaining metadata consistent images of a file system, or other types of data journaling software, stored on a temporal volume at each checkpoint stored on the temporal volume.

SUMMARY OF THE INVENTION

The present invention provides a method, system, and apparatus for maintaining consistent images of metadata and data in a file system or other data journaling software stored on a temporal volume. An intent log is maintained of all data and metadata modifying transactions, which is then replayed either asynchronously in the background or from a last known consistent checkpoint to a requested checkpoint thereby rendering the requested checkpoint data and metadata consistent. Such a system of maintaining consistency of data and metadata at checkpoints stored in a temporal volume file system allows users and applications to access temporal data more rapidly than a system in which data and metadata consistency must be calculated at the time of access.

In one embodiment of the present invention, a method, apparatus and system for rendering data and pending transactions to the data consistent at a selected checkpoint in a temporal volume is described. A checkpoint stored in a temporal volume is selected, wherein the temporal volume stores data and an intent log of transactions to the data, the state of which at a point-in-time is recorded at the checkpoint. The data and the intent log at the first checkpoint is analyzed to detect an incomplete transaction on the data, and any incomplete transactions are resolved.

In one aspect of the above embodiment, the temporal volume stores a journaling file system that includes the data, the intent log, and metadata. In such an aspect, an incomplete transaction results in a metadata inconsistency at a checkpoint. Resolving a metadata inconsistency can include replaying one or more incomplete transactions stored in the intent log at the checkpoint. In another aspect of the above embodiment, analyzing the data and intent log can include determining whether the intent log has previously been replayed, which can include accessing tracking data recorded on the temporal volume to find if the most recent replayed checkpoint is subsequent to the desired checkpoint or determining whether the desired checkpoint is within a range of checkpoints for which the intent log has already been replayed. In a further aspect of the present invention, replaying transactions in the intent log can include reading a transaction recorded at the checkpoint, performing actions recorded at the transaction on the data or metadata recorded at the checkpoint, and recording the results of those actions at either the checkpoint or a selected checkpoint.

The foregoing is a summary and thus contains, by necessity, simplifications, generalizations and omissions of detail. Consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 1A illustrates a series of changes in data blocks 0-8 in a journaling file system while performing two tasks.

FIG. 1B illustrates the data in data blocks 0-8 at a time $t_2$ both before replaying an intent log and after replaying the intent log.

FIG. 2A illustrates a file system containing data blocks 0-8 on a temporal volume, where a checkpoint is recorded at each time $t_0$-$t_6$.

FIG. 2B illustrates the state of a file system on a temporal volume after a continuous background replay of a metadata intent log has been performed at each checkpoint in accord with one embodiment of the present invention.

DETAILED DESCRIPTION

Figure 3:
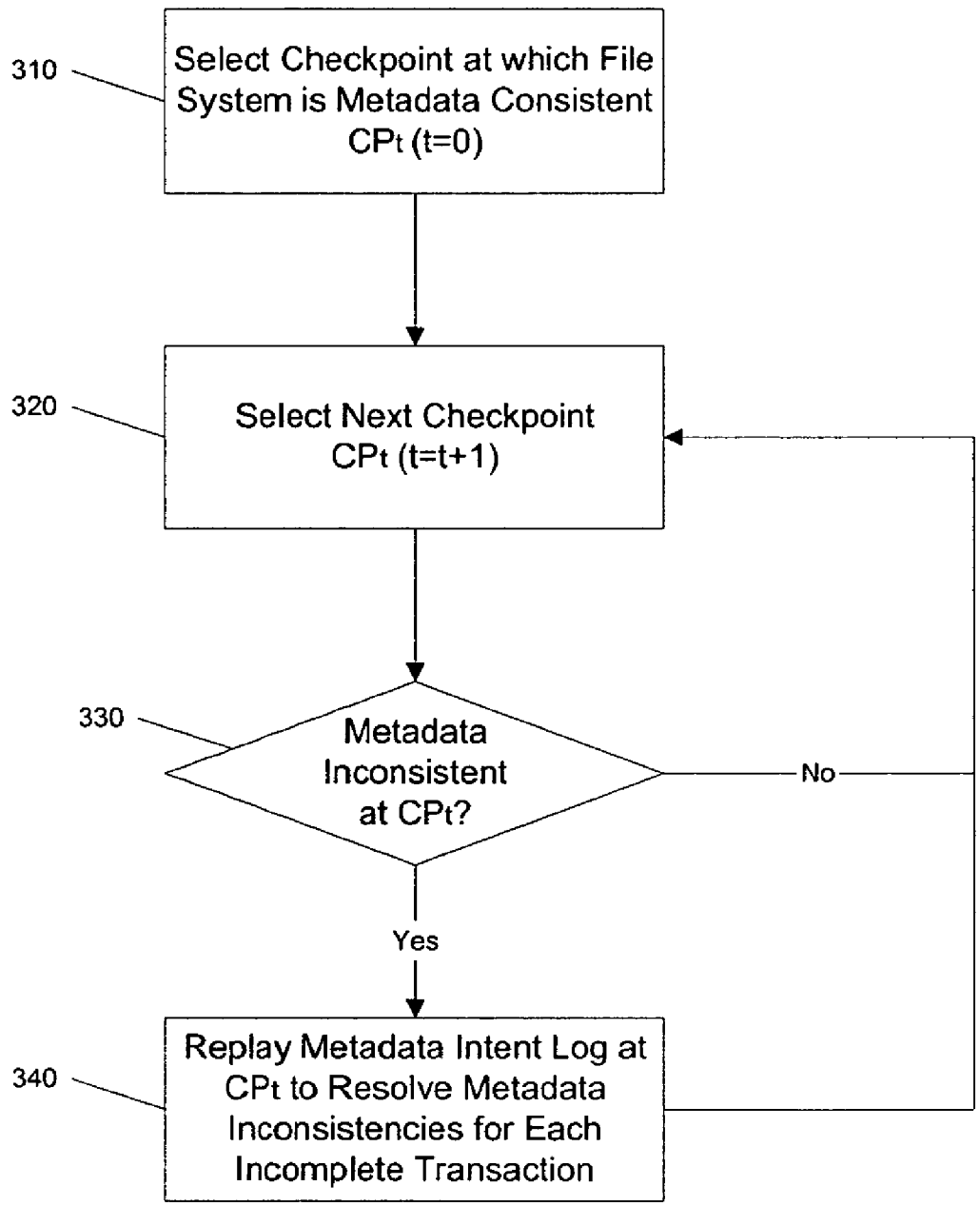
FIG. 3 is a flow diagram illustrating a continuous intent log replay process in accord with one embodiment of the present invention.

The present invention applies the principles of journaling software, such as a journaling file system, to such software stored on a temporal volume. While the examples below discuss embodiments of the invention in terms of a journaling file system, the invention is applicable to any data journaling software, such as databases. As presented above, the state of a file system at each checkpoint on a temporal volume can be thought of as the state of a file system as if the system suffered a crash at a time corresponding with a checkpoint. Thus, a simple solution to achieving metadata consistency at a checkpoint is to replay a metadata intent log in its state recorded at the checkpoint whenever accessing that checkpoint in the file system. But such a process can create access latencies for data on the temporal volume. Embodiments of the present invention include replaying the metadata intent log over a series of checkpoints thereby rendering the metadata consistent at each of those checkpoints. Such a process increases the likelihood that upon accessing data at a checkpoint that the file system will already be metadata consistent at the checkpoint, or if the data is not metadata consistent, that the time for replaying the log to achieve metadata consistency will be reduced.

FIG. 1A, as discussed above, illustrates the state of a journaling file system over a time period $t_0$-$t_6$ while performing two operations concurrently. FIG. 1B further illustrates the result of replaying an intent log at time $t_2$, thereby rendering the file system at that time to be metadata consistent.

FIG. 2A illustrates the same journaling file system stored on a temporal volume. Each time $t_0$-$t_6$ is recorded as a checkpoint on the temporal volume. At each checkpoint, only modified blocks are recorded. Blocks not modified and recorded at a checkpoint are accessible as they were at the last recorded checkpoint. Therefore, once a metadata intent log is replayed at a checkpoint, the updated information in the blocks at that checkpoint is available to applications accessing the file system at later checkpoints. When accessing the file system at a metadata inconsistent checkpoint, one need only to replay the intent log for operations occurring since the last metadata consistent checkpoint.

In order to provide more rapid access to metadata consistent images in a file system at checkpoints on a temporal volume, a metadata intent log can be replayed continuously and asynchronously in the background. An asynchronous background process can replay the log sequentially at each checkpoint recorded on the temporal volume (i.e., once the log has been replayed for the checkpoint at $t_1$, the background process can then go on to the next log record written at checkpoint $t_2$ and replay that log to get a metadata consistent image at $t_2$, etc.). Should a user or application attempt to access data at a checkpoint that has already been rendered metadata consistent by the background process, then the user or application can immediately access the data. Should the user or application attempt to access data at a checkpoint has yet to be rendered metadata consistent by the background process, then the metadata intent log will need to be replayed at checkpoints between the last metadata consistent checkpoint and the desired checkpoint. Such a process will be substantially quicker than replaying the intent log for all checkpoints since an initially metadata consistent checkpoint $t_0$.

Alternatively, the file system can be rendered metadata consistent on demand. The latest metadata consistent checkpoint before a desired metadata inconsistent checkpoint is found and then intent log records added since the latest consistency point are replayed up to the desired checkpoint. The modified blocks are then recorded and associated with the desired checkpoint. In this manner, the intent log replay will form a new metadata consistent point at the desired checkpoint. Other events involving the file system, such as file system freeze or rebuild, can automatically form metadata consistent checkpoints. Such periodic consistency points can be thought of as forcing a log replay at regular intervals to create a metadata consistent image at a particular checkpoint.

A further alternative to rendering a file system's data and metadata consistent is to replay an entire metadata intent log at a chose point in time. But, as stated above, such a process can lead to data access latencies on the temporal volume.

FIGS. 2A and 2B illustrate the concept of a continuous background replay of an intent log as discussed above. FIG. 2A illustrates a file system stored on a temporal volume with operations occurring at periodic checkpoints. Only blocks modified since the previous checkpoint are recorded at each checkpoint. FIG. 2B illustrates the state of the file system on the temporal volume after a continuous background replay of the metadata intent log has been performed at each checkpoint. At checkpoint $t_1$, a metadata intent log entry for the rename operation was entered into block 1. To render the file system metadata consistent at $t_1$, the log is replayed and the actions performed, resulting in the information in block 6 to be removed and the association in block 7 to be entered. At checkpoint $t_2$, the file system is metadata consistent because the file system has access to the consistent image at checkpoint $t_0$. In a similar fashion, at checkpoint $t_3$, a log entry for the create operation is stored in block 2 again creating a metadata inconsistent image. The log entry is then replayed with inode i4 being stored in block 5 and the directory entry linking e with i4 is entered into directory block 6, and a log entry indicating that the transaction is done is entered into block 3.

Modifications to the data at a checkpoint are given a timestamp that is the same as that associated with the intent log entry. In one embodiment, the transaction timestamp can be recorded with the log entry of the transaction. The log replay process will then have access to the transaction's timestamp when the replay process reads the log entry. In another embodiment, the transaction timestamp can be the time at which the log entry was written to the temporal volume. Such a timestamp can be provided by the temporal volume itself. In this embodiment, log entries can be flushed to the disk in the same order as the log entries are committed, thus ensuring that the temporal volume timestamps for the log entries have the same order as when the transactions happened.

FIG. 2B also illustrates that metadata flushing is done twice, once by the intent log replay process and once by the file system lazily flushing the metadata associated with a transaction (e.g., changes to block 6 at $t_2$, block 7 at $t_4$, block 5 at $t_5$, and block 6 at $t_6$). This is the same lazy flush of metadata that used by journaling file systems discussed in relation to FIG. 1A. As discussed above, the log replay provides the property that the file system is metadata consistent at all checkpoints in the temporal volume. Lazy flushing by a journaling file system occurs over several points in time (or checkpoints), and therefore the volume is not necessarily metadata consistent at any checkpoint. Flushing duplication of the metadata transaction log occurs if a background log replay process embodied by the present invention is decoupled from file system transaction journaling. If the background log replay process is coupled with the flushing functionality of the file system, then additional flushes, such as those illustrated, can be avoided. One embodiment of such a coupled file system involves queuing asynchronous flushes of associated metadata page each time a transaction is committed. A person of ordinary skill in the art will appreciate that there are other methods of integrating the log functionality disclosed herein with the metadata flushing process of a file system.

FIG. 3 is a flow diagram illustrating a continuous log replay process in accord with one embodiment of the present invention. A checkpoint is selected at which the file system on the temporal volume is metadata consistent (310). This checkpoint, $CP_t$ (t=0), becomes the starting point for the continuous background replay of the metadata intent log. This metadata consistency checkpoint can coincide with an event such as a file system freeze automatically forming a metadata consistent point or can be the point at which a prior log replay was halted. The next checkpoint recorded on the temporal volume, $CP_t$ (t=t+1), is selected (320). The file system is examined for metadata inconsistency at $CP_t$ (330). Such a review for metadata inconsistency can include inspecting the metadata intent log for any unfinished transactions. The review can take into account repair of metadata inconsistencies performed at earlier checkpoints, thus avoiding multiply replaying the same portions of a metadata intent log. If there are no metadata inconsistencies at the checkpoint, the file system can review the next checkpoint. If there are metadata inconsistencies, then the metadata intent log at checkpoint $CP_t$ is replayed to resolve the metadata inconsistencies for each incomplete transaction at $CP_t$ (340). Once each incomplete transaction at $CP_t$ has been resolved by replaying the intent log, the file system at the checkpoint is rendered metadata consistent and the continuous background replay system for the intent log can continue to the next recorded checkpoint.

Figure 4:
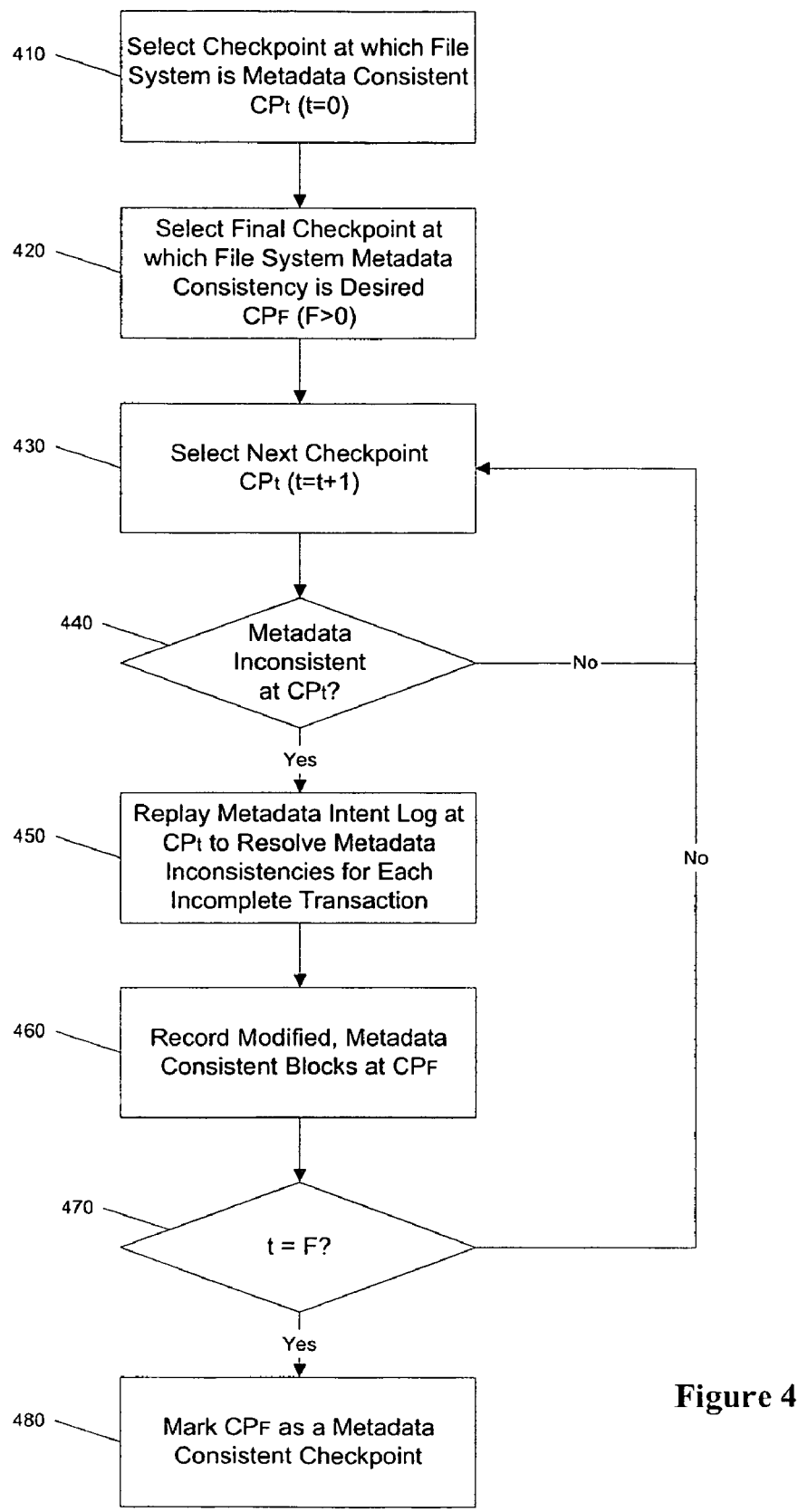
FIG. 4 is a flow diagram illustrating an alternate log replay process in accord with one embodiment of the present invention.

FIG. 4 is a flow diagram of an alternate embodiment of the present invention. In this embodiment, rather than continuously running a background process to replay the intent log at each checkpoint, the intent log is replayed from the most recent, previous checkpoint at which the file system metadata is consistent to a selected checkpoint $CP_F$ at which file system metadata consistency is desired. Again, the initial step is to select or find an initial checkpoint at which the file system stored on the temporal volume is metadata consistent, $CP_t$ (t=0) (410). This checkpoint can be the last time at which the file system was frozen (e.g., upon a crash recovery) or the last checkpoint to which a previous replay of transactions logs was performed. A user or application can then select a checkpoint $CP_F$ (F>0) at which temporal volume file system metadata consistency is desired (420). The log replay system can select the next recorded checkpoint on the file system $CP_t$ (t=t+1) (430). A check is made to determine whether the file system metadata is inconsistent at $CP_t$ (440). Such a check is similar to that performed at 330, and in the embodiments described above. If there are no metadata inconsistencies at $CP_t$, then the replay system selects the next $CP_t$. If there are metadata inconsistencies, then the metadata intent log is replayed at $CP_t$ to resolve metadata inconsistencies for each incomplete transaction (450). The results of the intent log replay at $CP_t$ are recorded at $CP_F$ (460), rather than at $CP_t$. If t≠F, then the system progresses to the next $CP_t$. Once T=F (i.e., all intermediate checkpoints have been reviewed and a log replay has occurred, if needed), then $CP_F$ contains records of modifications to all blocks modified by transactions occurring in the period between $CP_0$ and $CP_F$. $CP_F$ is then a metadata consistent checkpoint.

Using the system illustrated in FIG. 4, should a user or application desire to access the file system at a checkpoint later than $CP_F$, then the system can be repeated with an initial starting point at $CP_F$ (designating $CP_F$ as $CP_0$) and progressing through to the desired checkpoint.

In one embodiment of the present invention, a determination of whether metadata is inconsistent and a log replay is required (330 & 440) is made by reserving a tracker block in the file system to track a timestamp of a transaction that was replayed. When a transaction is replayed, the tracker block is updated with a timestamp associated with the transaction. As an example, if an intent log is replayed up to a transaction tr10 that was performed at a time $t_{10}$, then the tracker block is written with timestamp $t_{10}$. Similarly, if a transaction tr11 performed at a time $t_{11}$ is replayed, the tracker block is written with timestamp $t_{11}$. An image of the file system at a checkpoint corresponding to time $t_{10}$ (i.e., $CP_{10}$) includes the tracker block with the update at $t_{10}$ and an image of the file system at a checkpoint corresponding to time $t_{11}$ (i.e., $CP_{11}$) includes the tracker block with the update at $t_{11}$. When accessing an image of the file system at a checkpoint, the tracker block can be accessed to determine whether the intent log has been replayed for a time corresponding to that checkpoint. If the time recorded in the tracker block is less than that of the checkpoint, then a replay from the tracker block time to that of the checkpoint is required. Alternatively, the tracker block can record an index of the last checkpoint that has been replayed, and if the index of the desired checkpoint is greater than that of the tracker block, then a replay from the tracker block index to that of the desired checkpoint is required.

In another embodiment of the present invention, a determination of whether metadata is inconsistent and whether a log replay is required (330 & 440) is made by tracking ranges of checkpoints that are data and metadata consistent. Using as an example the file system depicted in FIG. 2A, the file system is metadata consistent at checkpoint $t_0$; the file system could be freshly created and mounted at that time or could have been the subject of a rebuild operation leaving no data and metadata inconsistencies. If a user or application accesses the file system at checkpoint $t_1$, a search is made for the latest consistent checkpoint, which is $t_0$. Transactions can then be replayed from checkpoint $t_0$ to checkpoint $t_1$. It is then recorded in the file system that $t_0$-$t_1$ is a "consistent range." If the user or application then accesses the file system at $t_2$, $t_1$ is at the end of the last consistent range and so only transactions subsequent to checkpoint $t_1$ need be replayed. In another scenario, should the consistent range be $t_0$-$t_6$ and a user or application access the file system at checkpoint $t_4$, then no replay need be performed since $t_4$ falls within the consistent range.

In another aspect of the "consistent range" embodiment, if, for example, a user or application accesses the file system at a checkpoint $t_{99}$ (not shown in FIG. 2A) and the last consistent checkpoint is $t_6$, it is not necessary to replay each transaction between checkpoints $t_6$ and $t_{99}$. The intent log can be replayed at checkpoint $t_{99}$. Since the intent log (as shown in FIG. 2A) contains only three records (blocks 1, 2, and 3), data and metadata consistency at checkpoint $t_{99}$ can be obtained by replaying just those transactions recorded at that checkpoint (i.e., those transactions in blocks 1, 2, and 3). If the user or application then accesses the file system at a checkpoint $t_{101}$ (not shown in FIG. 2A), then transactions recorded at that checkpoint and the intervening checkpoint (i.e., checkpoint $t_{100}$) can be replayed and recorded at those checkpoints to render checkpoints $t_{100}$ and $t_{101}$ data and metadata consistent, and checkpoint range $t_{99}$-$t_{101}$ can be recorded as a consistent range. Should the user or application access the file system at a checkpoint $t_{98}$ (not shown in FIG. 2A), again the last consistent checkpoint is $t_6$, since making checkpoint $t_{99}$ a consistent checkpoint did not establish a consistent range back to checkpoint $t_6$. But, if each checkpoint contains a single transaction entry, then replaying the intent log at $t_{99}$ replayed tr97, tr98, and tr99. In that single transaction entry scenario, the only other transaction in the intent log at $t_{98}$ is tr96 and only that transaction need be replayed to get a data and metadata consistent image at checkpoints $t_{98}$ and checkpoint range $t_{98}$-$t_{101}$ can then be recorded as the consistent range, because each checkpoint in that range has been rendered consistent.

An Example Computing And Network Environment

As shown above, the present invention can be implemented using a variety of computer systems and networks. An example of one such computing and network environment is described below with reference to FIGS. 5 and 6.

Figure 5:
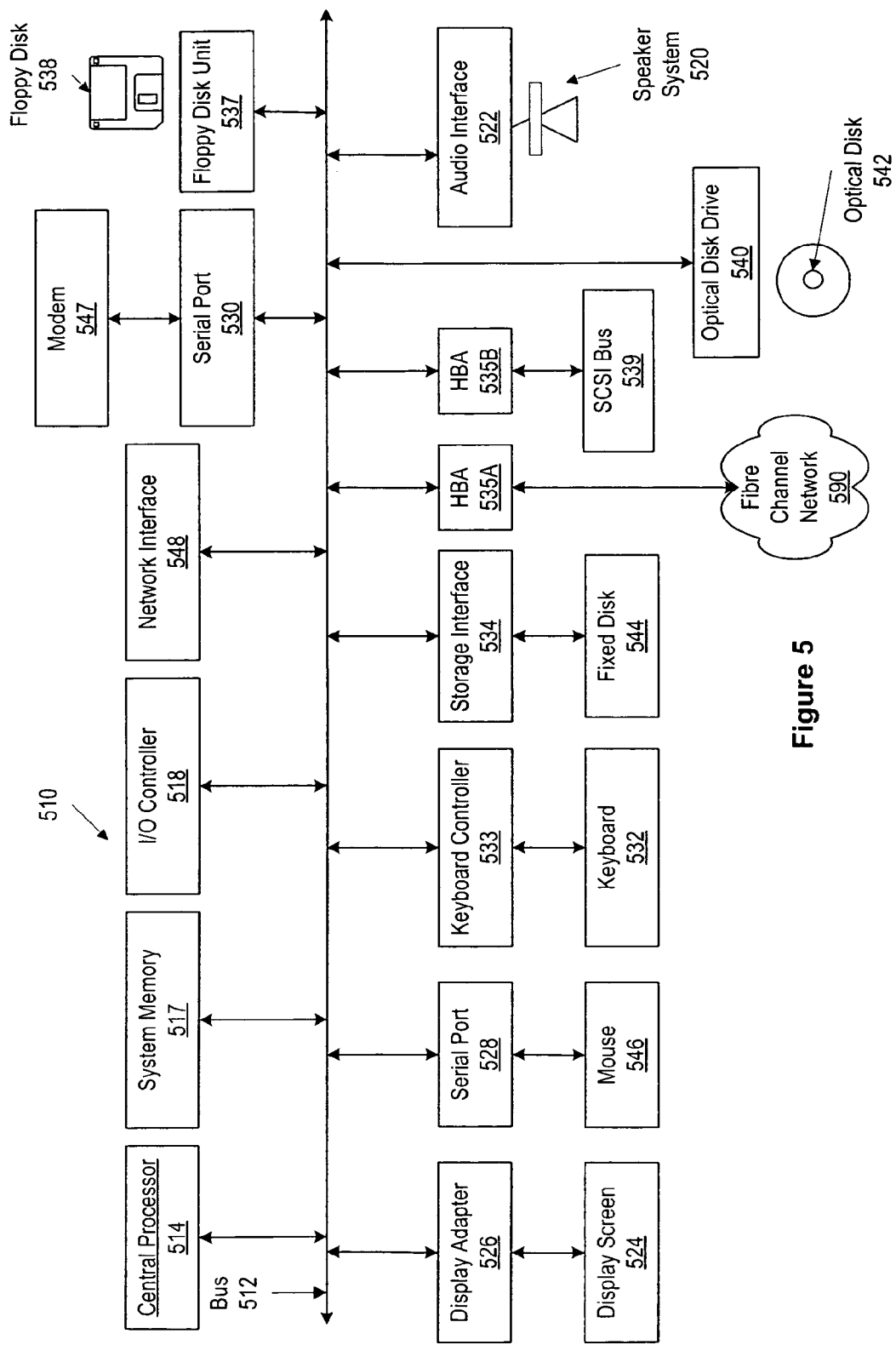
FIG. 5 is a block diagram of a computer system suitable for implementing an embodiment of the present invention.

FIG. 5 depicts a block diagram of a computer system 510 suitable for implementing the present invention. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a fibre channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. Additionally, computer system 510 can be any kind of computing device, and so includes personal data assistants (PDAs), network appliance, X-window terminal or other such computing devices. The operating system provided on computer system 510 may be MS-DOS®, MS-WINDOWS®, OS/2®, UNIX®, Linuxg, or another known operating system. Computer system 510 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
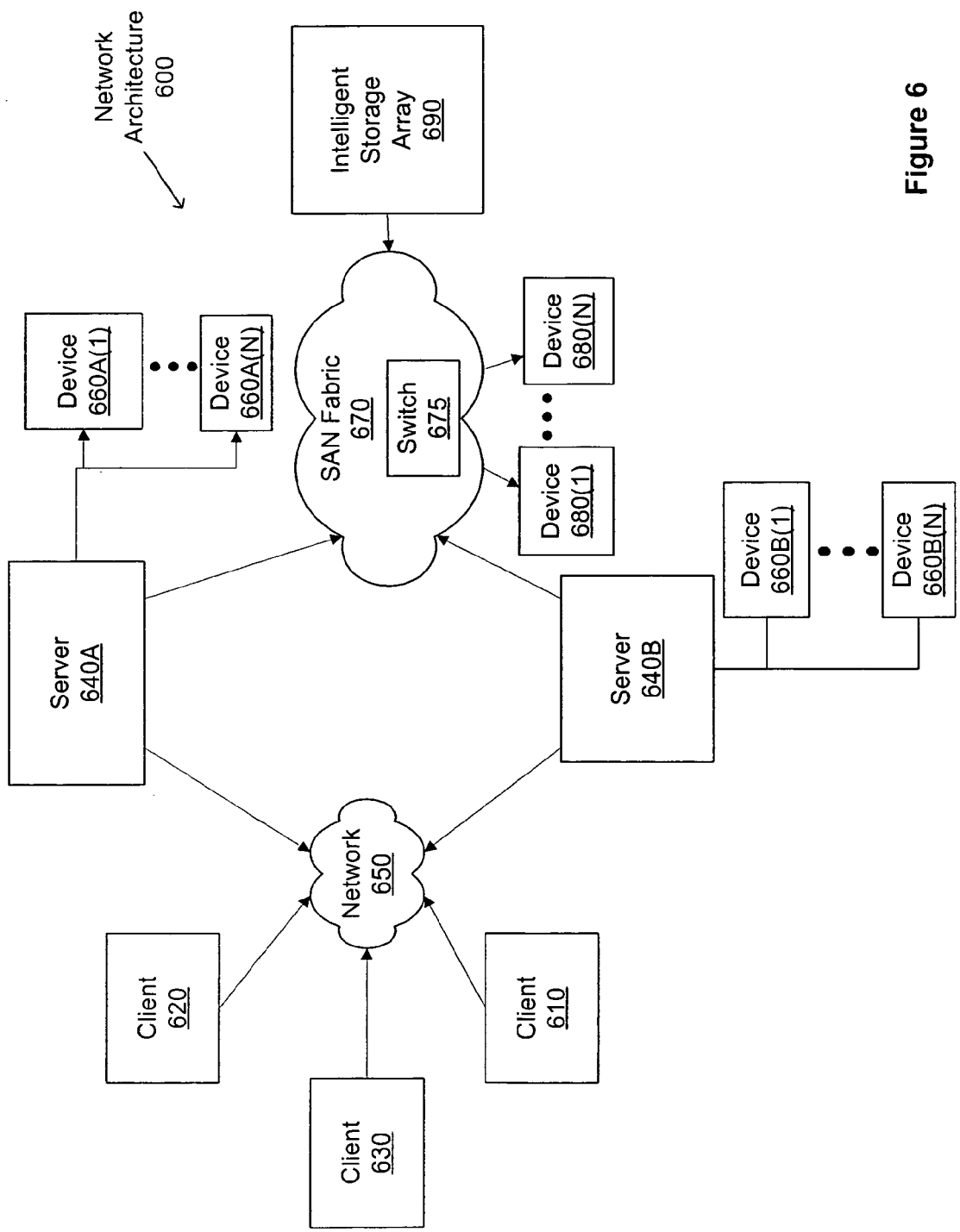
FIG. 6 is a block diagram of a network architecture suitable for implementing an embodiment of the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. SAN fabric 670 can include one or more switches 675 that can be configured to perform storage virtualization. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    selecting a first checkpoint from a plurality of checkpoints stored in a temporal volume, wherein
        the temporal volume comprises data and an intent 102 of transactions to the data,
        a state of the data and intent 102 is recorded at each checkpoint of the plurality of checkpoints, and
        the first checkpoint is metadata consistent;
    selecting a second checkpoint from the plurality of checkpoints stored in the temporal volume, wherein
        the second checkpoint is recorded at a time after the first checkpoint, and
        the second checkpoint is metadata inconsistent between data and metadata recorded at the second checkpoint;
    in response to the selecting the second checkpoint, selecting a third checkpoint from the plurality of checkpoints stored in the temporal volume, wherein
        the third checkpoint is recorded at a time after the first checkpoint but at a time before the second checkpoint;
    analyzing the data and intent log to detect an incomplete transaction at the third checkpoint, wherein
        the incomplete transaction results in a metadata inconsistency between data and metadata at the third checkpoint, and
        the metadata inconsistency at the third checkpoint contributes to the metadata inconsistency at the second checkpoint; and
    upon detecting the incomplete transaction at the third checkpoint, resolving the incomplete transaction at the third checkpoint by replaying one or more transactions stored in the intent log stored at the third checkpoint, wherein the one or more transactions comprise the incomplete transaction.

2. The method of claim 1, wherein
a journaling file system comprises the data, the intent log, and the metadata.

3. The method of claim 1 wherein replaying the one or more transactions stored in the intent log stored at the third checkpoint comprises:
determining whether the intent log recorded at the third checkpoint has previously been replayed.

4. The method of claim 3 wherein determining whether the intent log recorded at the third checkpoint has previously been replayed comprises:
accessing tracking data recorded on the temporal volume, wherein
the tracking data comprises information related to a most recent checkpoint at which the intent log was replayed; and
determining that the intent log recorded at the third checkpoint has been replayed upon finding that the most recent checkpoint at which the intent log was replayed is subsequent to the third checkpoint.

5. The method of claim 3 wherein determining whether the intent log recorded at the third checkpoint has previously been replayed comprises:
determining limits of a range of checkpoints for which associated intent logs have been replayed; and
determining whether the third checkpoint is within the determined limits of the range.

6. The method of claim 2 wherein the analyzing the data and intent log to detect an incomplete transaction at the third checkpoint comprises:
reading the intent log; and
verifying that a transaction recorded in the intent log is reflected in corresponding data and metadata stored at the third checkpoint.

7. The method of claim 2 wherein replaying one or more transactions stored in the intent log stored at the third checkpoint comprises:
reading a transaction recorded at the third checkpoint, wherein
the transaction is an action to be performed on one or more of data and metadata recorded at the third checkpoint; and
performing the action to be performed on the one or more of data and metadata recorded at the third checkpoint.

8. The method of claim 7 further comprising:
recording results of performing the action at the third checkpoint.

9. The method of claim 7 further comprising:
recording results of performing the action at the second checkpoint.

10. The method of claim 1 further comprising:
analyzing the data and intent log at the second checkpoint to detect an incomplete transaction at the second checkpoint, wherein
the incomplete transaction at the second checkpoint is not resolved by resolving the incomplete transaction at the third checkpoint; and
upon detecting the incomplete transaction at the second checkpoint, resolving the incomplete transaction at the second checkpoint.

11. A system comprising:
a temporal volume comprising a computer readable storage medium for storing both present state data and non-present state data;
data and metadata recorded on the temporal volume at each checkpoint of a plurality of checkpoints; and
an intent log comprising a record of each transaction to be performed on the data and metadata stored at each checkpoint of the plurality of checkpoints on the temporal volume, wherein
a process selects a first, second, and third checkpoint from the plurality of checkpoints on the temporal volume, wherein
the first checkpoint is metadata consistent,
the second checkpoint is recorded at a time after the first checkpoint,
the second checkpoint is metadata inconsistent between data and metadata recorded at the second checkpoint, and
the third checkpoint is recorded at a time after the first checkpoint but at a time before the second checkpoint,
a process analyzes the data and intent log at the third checkpoint to detect an inconsistency between the data and metadata stored at the third checkpoint, wherein
the metadata inconsistency at the third checkpoint contributes to the metadata inconsistency at the second checkpoint, and
a process replays one or more transactions stored in the intent log at the third checkpoint to resolve an inconsistency between the data and metadata stored at the third checkpoint.

12. The system of claim 11 wherein a replay of the intent log stored at the third checkpoint comprises:
the process reads a transaction recorded in the intent log at the third checkpoint, wherein
the transaction is an action to be performed on one or more of the data and metadata stored at the third checkpoint; and
the process performs the action to be performed on the one or more of the data and metadata recorded at the third checkpoint.

13. The system of claim 12 wherein the replay of the intent log further comprises:
the process stores the result of performing the action at the third checkpoint.

14. The system of claim 12 wherein the replay of the intent log further comprises:
the process stores the result of performing the action at the second checkpoint.

15. The system of claim 11 further comprising:
the intent log further comprising a record of each transaction to be performed on data and metadata stored at the second checkpoint on the temporal volume;
wherein,
a process replays the intent log at the second checkpoint to resolve an inconsistency between data and metadata stored at the second checkpoint, wherein
the inconsistency between the data and metadata stored at the second checkpoint is not resolved by resolving the inconsistency at the third checkpoint.

16. An apparatus comprising:
a temporal volume comprising a computer readable storage medium for storing both present state data and non-present state data, wherein the data comprises a file system;

means for selecting a first checkpoint from a plurality of checkpoints stored in the temporal volume, wherein the state of the file system is recorded at each checkpoint of the plurality of checkpoints, and the first checkpoint is metadata consistent;

means for selecting a second checkpoint from the plurality of checkpoints stored in the temporal volume, wherein the second checkpoint is recorded at a time after the first checkpoint, and the second checkpoint is metadata inconsistent between data and metadata recorded at the second checkpoint;

means for selecting a third checkpoint from the plurality of checkpoints stored in the temporal volume, in response to the selecting the second checkpoint, wherein the third checkpoint is recorded at a time after the first checkpoint but at a time before the second checkpoint;

means for analyzing the file system to detect a metadata inconsistency at the third checkpoint, wherein the metadata inconsistency at the third checkpoint contributes to the metadata inconsistency at the second checkpoint; and means for resolving the metadata inconsistency at the third checkpoint upon detecting the metadata inconsistency at the third checkpoint by means for replaying the metadata intent log stored at the third checkpoint.

17. The apparatus of claim 16 wherein the means for analyzing the file system to detect the metadata inconsistency at the third checkpoint comprises:

means for reviewing the metadata intent log recorded at the third checkpoint for an incomplete transaction at the third checkpoint.

18. The apparatus of claim 17 wherein the means for reviewing the metadata intent log stored at the third checkpoint comprises:

means for reading the metadata intent log; and means for verifying that a transaction recorded in the metadata intent log is reflected in corresponding metadata stored at the third checkpoint.

19. The apparatus of claim 16 wherein the means for replaying the metadata intent log stored at the third checkpoint comprises:

means for reading a transaction recorded at the third checkpoint, wherein the transaction is an action to be performed on file system metadata recorded at the third checkpoint; and means for performing the action to be performed on file system metadata recorded at the third checkpoint.

20. The apparatus of claim 19 further comprising:

means for recording a product of the means for performing the action at the third checkpoint.

21. The apparatus of claim 19 further comprising:

means for recording a product of the means for performing the action at the second checkpoint of the plurality of checkpoints.

22. The apparatus of claim 16 further comprising:

means for analyzing the file system at the second checkpoint to detect a metadata inconsistency at the second checkpoint, wherein the metadata inconsistency at the second checkpoint is not resolved by resolving the metadata inconsistency at the third checkpoint; and means for resolving the metadata inconsistency at the second checkpoint upon detecting the metadata inconsistency at the second checkpoint.

* * * * *